United States Patent
Kamal et al.

(10) Patent No.: US 9,569,516 B2
(45) Date of Patent: Feb. 14, 2017

(54) METHOD AND DEVICE FOR EXECUTING AN ENTERPRISE PROCESS

(71) Applicant: Tata Consultancy Services Limited, Mumbai (IN)

(72) Inventors: Nitin Kamal, Mumbai (IN); Venus Katela, Mumbai (IN)

(73) Assignee: Tata Consultancy Services Limited (IN)

( * ) Notice: Subject to any disclaimer, the term of this patent is extended or adjusted under 35 U.S.C. 154(b) by 652 days.

(21) Appl. No.: 14/032,915

(22) Filed: Sep. 20, 2013

(65) Prior Publication Data
US 2015/0046393 A1 Feb. 12, 2015

(30) Foreign Application Priority Data
Aug. 6, 2013 (IN) .......................... 2590/MUM/2013

(51) Int. Cl.
*G06F 7/00* (2006.01)
*G06F 17/00* (2006.01)
*G06F 17/30* (2006.01)
*G06Q 10/10* (2012.01)

(52) U.S. Cl.
CPC ....... *G06F 17/30581* (2013.01); *G06Q 10/103* (2013.01); *G06F 17/30575* (2013.01)

(58) Field of Classification Search
CPC .................... G06F 17/30575; G06F 17/30176; H04L 67/1095
USPC ........................................................ 707/617
See application file for complete search history.

(56) References Cited

U.S. PATENT DOCUMENTS

| 6,505,200 B1 | 1/2003 | Ims et al. |
| 6,879,989 B2 | 4/2005 | Cheng et al. |
| 8,037,110 B2 | 10/2011 | Salgado et al. |
| 2002/0045436 A1* | 4/2002 | Ekanayake ............. H04L 29/06 455/406 |
| 2003/0195765 A1* | 10/2003 | Sehgal .............. G06F 17/30557 705/1.1 |

(Continued)

OTHER PUBLICATIONS

Ausum Systems, "Audrey Audit Relay 4.0," http://www.ausum.net/resources/products-audrey-prodsheet.pdf (2009).

(Continued)

*Primary Examiner* — Binh V Ho
(74) *Attorney, Agent, or Firm* — Finnegan, Henderson, Farabow, Garrett, & Dunner, LLP

(57) ABSTRACT

The present subject matter relates to execution of an enterprise process through an electronic device. In one embodiment, an enterprise process execution method is disclosed, comprising: replicating data from a centralized database in a local database; creating a first set of data fields based on a first set of rules, wherein the first set of data fields is populated with a first set of data values retrieved from the local database based on a second set of rules; dynamically creating a second set of data fields populated with a second set of data values, wherein each data field of the second set of data fields is dynamically created based on a data value of a previous data field; validating the second set of data fields; and synchronizing the local database storing a report including information associated with execution of an enterprise process with the centralized database.

17 Claims, 4 Drawing Sheets

(56) References Cited

U.S. PATENT DOCUMENTS

| | | | |
|---|---|---|---|
| 2005/0043998 A1* | 2/2005 | Bross | G06Q 20/207 705/19 |
| 2005/0209903 A1* | 9/2005 | Hunter | G06Q 10/10 705/7.26 |
| 2006/0004675 A1* | 1/2006 | Bennett | G06Q 10/08 705/402 |
| 2007/0067204 A1* | 3/2007 | Brown | G06Q 10/06315 705/7.13 |
| 2007/0078950 A1* | 4/2007 | Hopkins | G06F 17/30861 709/217 |
| 2007/0143496 A1* | 6/2007 | Golovinsky | G06F 17/3089 709/238 |
| 2007/0192678 A1* | 8/2007 | Tang | G06F 17/243 715/234 |
| 2008/0059538 A1* | 3/2008 | Engel | G06F 17/30176 |
| 2010/0262557 A1* | 10/2010 | Ferreira | G06Q 10/067 705/348 |
| 2011/0066934 A1* | 3/2011 | Treisman | G06F 17/243 715/222 |
| 2013/0097480 A1* | 4/2013 | Allison | G06Q 10/10 715/223 |
| 2014/0365436 A1* | 12/2014 | Calienes | G06F 17/30581 707/620 |

OTHER PUBLICATIONS

Zumero LLC, "Sync Outside the Box," http://zumero.com/features/ (2013).

Gruszczynski et al., "Offline Business Objects: Enabling Data Persistence for Distributed Desktop Applications," Lecture Notes in Computer Science, vol. 3761, pp. 960-977 (Nov. 4, 2005).

* cited by examiner

METHOD AND DEVICE FOR EXECUTING AN ENTERPRISE PROCESS

PRIORITY CLAIM

This U.S. patent application claims priority under 35 U.S.C. §119 to: India Application No. 2590/MUM/2013, filed Aug. 6, 2013. The aforementioned application is incorporated herein by reference in its entirety.

TECHNICAL FIELD

The present subject matter described herein relates, in general, to enterprise applications, and more particularly relates to execution of an enterprise process through an electronic device in at least one of an offline mode and an online mode.

BACKGROUND

In distributed application configurations, the client-server architecture provides a convenient way to a user for accessing applications deployed on a server. These applications are adapted to manage and track enterprise processes in an enterprise. The user may access the application through a client machine such as a laptop, from a remote location via a network. The client-server architecture further facilitates the user to access different resources available on the server without deploying such resources on the user's laptop. In one aspect, the resources may comprise a subset of data stored on the server for processing the subset of data. In certain scenarios, the user may need to access the applications from the remote location where no network connectivity is available which eventually hinders the user to access the business applications and also the available resources. This may affect in controlling the overall execution of the enterprise processes.

One example of the enterprise processes facilitating such client-server architecture, may be auditing of the products being insured by an enterprise to various insurers. In such scenario, an audit application may be installed on a computing system carried by an auditor who is responsible for conducting audit of insurers by visiting the insurers' location.

In order to facilitate effective premium calculations, the auditor may utilize auditing application installed on the computing system. These auditing applications are traditional spreadsheet based applications comprising embedded resources such as macros and VB screens that facilitate filling and validation of the data entered by the auditor for conducting the auditing process. However, these applications are error-prone, complex and onerous. For example, the spreadsheet based applications may involve multiple tabs which the auditor has to fill in, which when filled by the user instantiate dynamic creation of new tabs which further adds to complexity of the application. Further, the spreadsheet based application uses low level MS-Excel data security due to which data corruption and data mismatch are frequent that further leads to generation of IT support tickets to fix the data mismatch. Such data mismatch may occur due to lack of clarity or oversight from the auditors' perspective towards altering or updating the MS-Excel formulas and logic.

The audit applications further requires the auditor to perform the audit in the offline mode that needs to sync the spreadsheet based application with the server. In order to synchronize, a set of batch jobs are run to extract content from the spreadsheet based application and then convert them into a format that is recognized by a database located on the server. However, such data synchronization is prone to delays and lags which subsequently slows down the overall audit process.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods executing an enterprise process through an electronic device connected to a centralized server in at least one of an online mode and an offline mode and the concepts are further described below in the detailed description. This summary is not intended to identify essential features of the claimed subject matter nor is it intended for use in determining or limiting the scope of the claimed subject matter.

In one implementation, an electronic device for executing an enterprise process, connected to a centralized server is disclosed. The centralized server may comprise a master database storing data associated with the execution of the enterprise process. The electronic device may comprise a processor and a memory coupled to the processor for executing a plurality of modules present in the memory. The plurality of modules may further comprise a data replication module, a data field creation module, a data population module, a data field validation module, a report generation module and a synchronization module. In one aspect, the data replication module and the synchronization module may be executed when the electronic device is in online mode. On the contrary, the data field creation module, the data population module, the data field validation module and the report generation module may be executed when the electronic device is in offline mode. In one aspect, the data replication module may be configured to replicate the data in a local database of the electronic device. The data field creation module may be configured to create a first set of data fields and a second set of data fields. The data population module may be configured to populate a first set of data values and a second set of data values in the first set of data fields and the second set of data fields respectively. The data field validation module may further be configured to validate the second set of data fields. The report generation module may be configured to generate report depicting information associated with the execution the execution process based on analysis performed on the first set of data values and the second set of data values. After generating the report, the synchronization module may be configured to synchronize the local database comprising the report with the master database to facilitate the execution of the enterprise process.

In another implementation, a method for executing an enterprise process through an electronic device connected to a centralized server is disclosed. The centralized server may comprise a master database storing data associated with the enterprise process. When the electronic device is in online mode, the data may be replicated from the master database and stored in a local database located in the electronic device. Further, when the electronic device is in offline mode, a first set of data fields may be created based on a first set of rules. In one aspect, the first set of data fields may be populated with a first set of data values being retrieved from the data in the local database based on a second set of rules. Further a second set of data fields may be dynamically created, which may be populated with a second set of data values received from a user. Further each successive data field of the second set of data fields may be dynamically created based on a data value of a previous data field of the each successive data field and the first set of rules. After populating the second set of data fields, a validation of the second set of data fields may be performed based on a third set of rules in order to generate a report depicting information associated with the execution of the enterprise process. In one aspect, the report may be generated based on analysis performed on the first set of data values and the second set of data values. After the report is generated, the local database comprising the report may be synchronized with the master database in order to facilitate the execution of the enterprise process when the electronic device may be in the online mode. In one aspect, the method steps of the replicating, the creating, the dynamically creating, the validating, the generating and the synchronizing may be performed by a processor using programmed instructions stored in a memory.

In yet another implementation, a non transitory computer program product having embodied thereon a computer program for executing an enterprise process through an electronic device connected to a centralized server is disclosed. The centralized server may comprise a master database storing data associated with the enterprise process. The computer program product may comprise instructions for replicating the data in a local database of the electronic device. The computer program product may further comprise instructions for creating a first set of data fields based on a first set of rules. The first set of data fields may be populated with a first set of data values being retrieved from the data in the local database based on a second set of rules. The computer program product may further comprise instructions for dynamically creating a second set of data fields. The second set of data fields may be populated with a second set of data values received from a user, and wherein each successive data field of the second set of data fields may be dynamically created based on a data value of a previous data field of the each successive data field and the first set of rules. The computer program product may further comprise instructions for validating the second set of data fields based on a third set of rules. The computer program product may further comprise instructions for generating a report depicting information associated with the execution of the enterprise process based on analysis performed on the first set of data values and the second set of data values. The computer program product further may comprise instructions for synchronizing the local database comprising the report with the master database in order to facilitate the execution of the enterprise process. In one aspect, the instructions for the replicating and the synchronizing may be executed when the electronic device is in online mode. On the contrary, the instructions for the creating, the dynamically creating, the validating and the generating may be executed when the electronic device is in offline mode.

BRIEF DESCRIPTION OF THE DRAWINGS

The foregoing detailed description of embodiments is better understood when read in conjunction with the appended drawings. For the purpose of illustrating embodiments of the disclosure, there is shown in the present document example constructions of the embodiments; however, the embodiments are not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
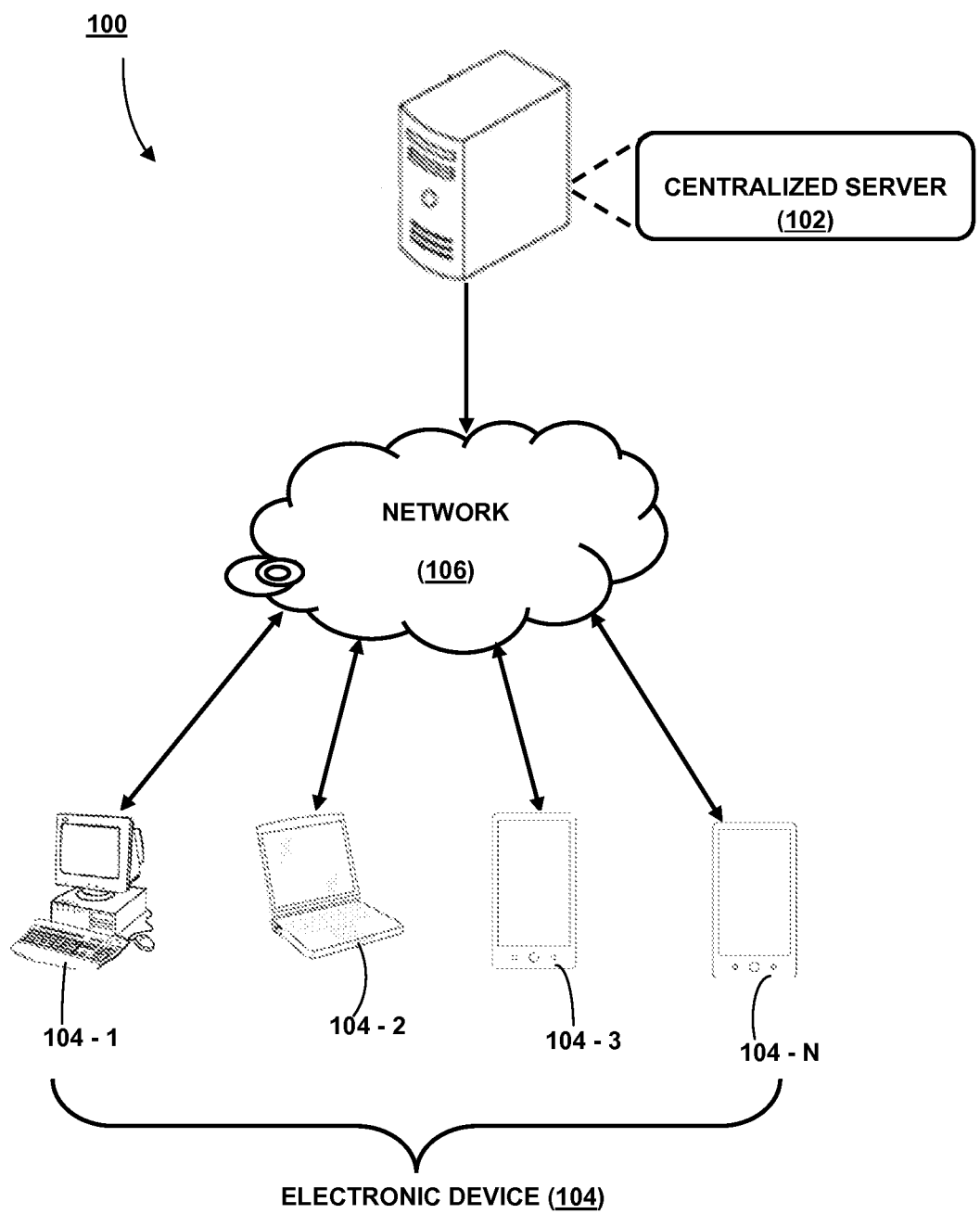
FIG. 1 illustrates a network implementation of an electronic device for executing an enterprise process through an electronic device connected to a centralized server in at least one of an online mode and an offline mode is shown, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the invention, which may be embodied in various forms.

Various modifications to the embodiment will be readily apparent to those skilled in the art and the generic principles herein may be applied to other embodiments. For example, although the present disclosure will be described in the context of a system and method for executing an enterprise process through an electronic device connected to a centralized server in at least one of an online mode and an offline mode, one of ordinary skill in the art will readily recognize that the method and system can be utilized in any situation where there is need to execute the enterprise process. Thus, the present disclosure is not intended to be limited to the embodiments illustrated, but is to be accorded the widest scope consistent with the principles and features described herein.

Systems and methods for executing an enterprise process through an electronic device connected to a centralized server are described. The present disclosure includes an effective and efficient method that provides a means for executing the enterprise process. In one aspect, the enterprise process may be associated with at least one of an insurance premium calculation as a part of premium audit, traffic police monitoring, census monitoring, land record survey, wholesale distributor tracking, delay detection, financial planners, and courier dispatcher tracking.

In one aspect, the electronic device may be connected to the centralized server comprising a master database storing data associated with the enterprise process. In order to execute the enterprise process, initially a local database comprising the data may be replicated to the electronic device from the centralized server. In one aspect, the local database may be replicated to the electronic device when the electronic device is in the online mode. In one aspect, the local database may be a SQLite database or any other lightweight relational database capable of storing the data.

In order to execute the enterprise process, the electronic device may not be connected to the server or may be intermittently connected to the server, and hence after the data may be replicated from the master database to the local database, the electronic device switches from the online mode to the offline mode. During the offline mode, the electronic device may be configured to create a first set of data fields and a second set of data fields. In one aspect, the first set of data fields and the second set of data fields may be created using at least one of Adobe Flex®, hyper text markup language (HTML), jQuery™ and a HAXE-NLS framework. In one aspect, the first set of data fields may be populated with the first set of data values based on data type of each data field of the first set of data fields. After populating the first set of data fields, a second set of data fields may be populated with a second set of data values. In one aspect, the second set of data values may be received from a user based on the data type of the each data field of the second set of data field. After receiving the second set of data values, the electronic device may further be configured to populate the second set of data values into the second set of data fields. In one aspect, the first set of data values are static and may be dependent on the data of the enterprise process whereas the second set of data values may be dynamic and populated based on the first set of data values. Subsequent to the population of the first set of data fields and the second set of data fields, the first set of data values and the second set of data values may be validated to eliminate errors and data duplicity. After validating the first set of data values and the second set of data values, report depicting information associated with the execution of the enterprise process may be generated and stored in the local database for future reference.

In one aspect, the electronic device may again appear within the proximity of the centralized server and hence switch back into the online mode from the offline mode. During the online mode, the electronic device may further be configured to synchronize the local database having the report stored therein with the master database. In one aspect, the synchronization may be performed using an open source data services components such as a BlazeDS, a GraphiteDS, or Adobe Livecycle DataServices (LCDS).

While aspects of described system and method for executing an enterprise process through an electronic device connected to a centralized server in at least one of the online mode and the offline mode may be implemented in any number of different computing systems, environments, and/or configurations, the embodiments are described in the context of the following exemplary system.

Referring now to FIG. 1, a network implementation 100 of an electronic device 104 for executing an enterprise process is illustrated, in accordance with an embodiment of the present subject matter. In one aspect, the electronic device 104 may be connected to a centralized server 102. In order to execute the enterprise process, initially the electronic device 104 may be configured to replicate the data, stored in a master database located on the centralized server 102, to a local database of the electronic device 104. In one aspect, the replication of the data may occur when the electronic device 104 is in an online mode. In order to further execute the enterprise process, the electronic device 104 may not be present in the proximity of the centralized server 102. Thus after the data is replicated from the master database to the local database in the online mode, the electronic device 104 may switch from the online mode 308 to an offline mode 310. During the offline mode, the electronic device 104 may create a first set of data fields and a second set of data fields associated with the enterprise process to be executed. After creating the first set of data fields and the second set of data fields, the electronic device 104 may be configured to populate a first set of data values in the first set of data fields. The electronic device 104 may further be enabled to receive a second set of data values from a user to be populated in the second set of data fields. Subsequent to the population of the first set of data values and the second set of data values in the first set of data fields and the second set of data fields, the electronic device 104 may further be enabled to validate the second set of data fields. Upon validating the second set of data fields, the electronic device 104 may generate report depicting information associated with the execution the enterprise process. In one aspect, the report may be generated by analyzing the first set of data values and the second set of data values.

In one aspect, the electronic device 104 may again appear within the proximity of the centralized server 102. In order to facilitate the execution of the enterprise process, the electronic device 104 may switch back into the online mode from the offline mode. During the online mode, the electronic device 104 may further be configured to synchronize the local database comprising the report stored therein with the master database.

It is to be understood that the electronic device 104 may be implemented in a variety of computing systems, such as a laptop computer, a desktop computer, a notebook, a workstation, a mainframe computer, a server, a network server, and the like. It will be understood that the electronic device 104 may access the centralized server 102 by multiple users through one or more electronic device 104-1, 104-2 . . . 104-N, collectively referred to as a user hereinafter, or applications residing on the electronic device 104. Examples of the electronic device 104 may include, but are not limited to, a portable computer, a personal digital assistant, a handheld device, and a workstation. The centralized server 102 may be communicatively coupled to the electronic device 104 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network may represent an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
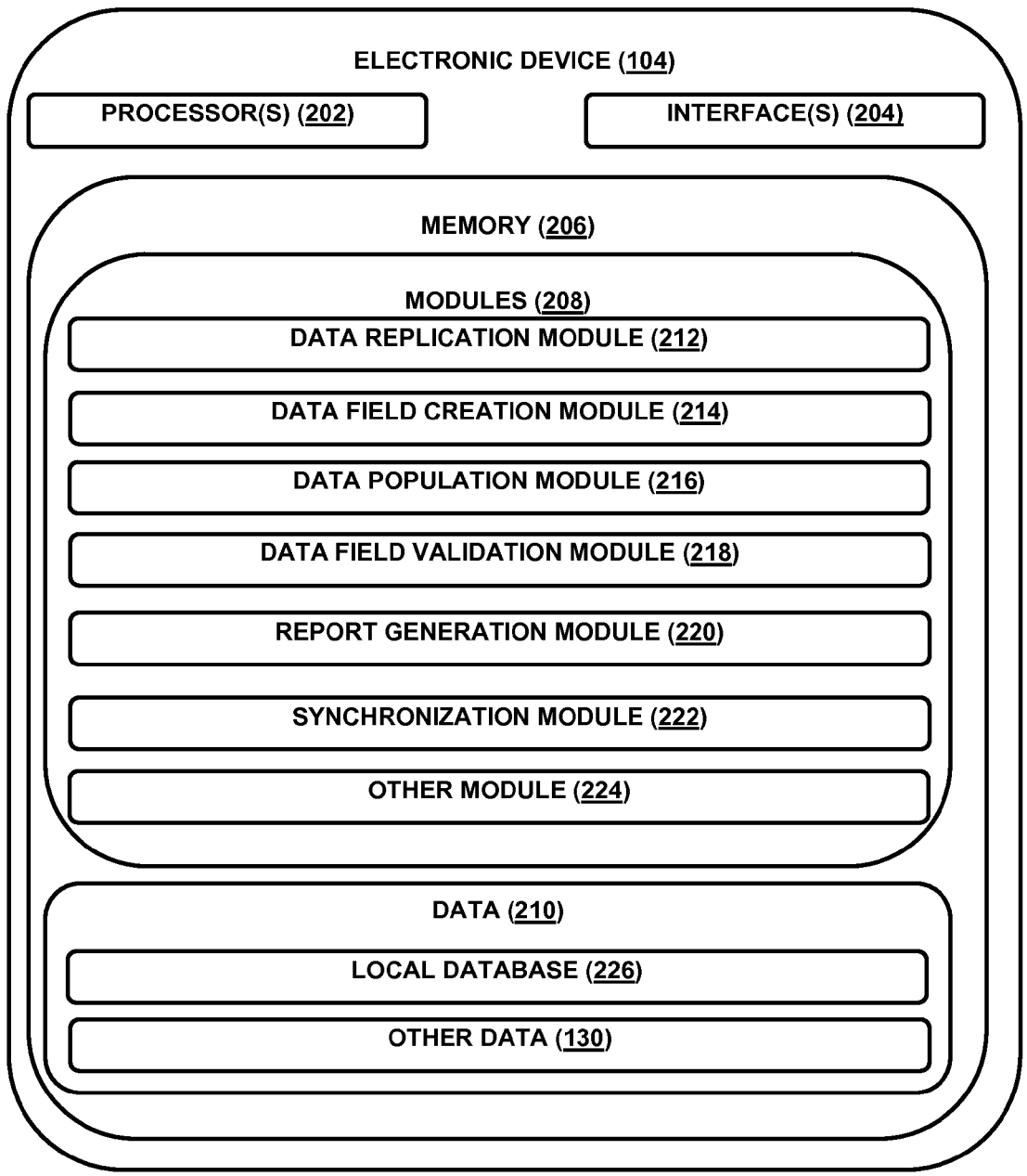
FIG. 2 illustrates the electronic device, in accordance with an embodiment of the present subject matter.

Referring now to FIG. 2, the electronic device 104 is illustrated in accordance with an embodiment of the present subject matter. In one embodiment, the electronic device 104 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the electronic device 104 to interact with a user directly or through the centralized server 102. Further, the I/O interface 204 may enable the electronic device 104 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data replication module 212, a data field creation module 214, a data population module 216, a data field validation module 218, a report generation module 220, a synchronization module 222, and other modules 224. The other modules 224 may include programs or coded instructions that supplement applications and functions of the electronic device 104.

The data 210, amongst other things, may serve as a repository for storing data processed, received, and generated by one or more of the modules 208. The data 210 may also include a local database 226, and other data 130. The other data 130 may include data generated as a result of the execution of one or more modules in the other modules 224.

In one implementation, at first, a user may use the electronic device 104 to access the centralized server 102 via the I/O interface 204. The user may register them using the I/O interface 204 in order to use the centralized server 102. The working of the electronic device 104 may be explained in detail in FIGS. 3 and 4 explained below. The electronic device 104 may be used for executing an enterprise process.

Figure 3:
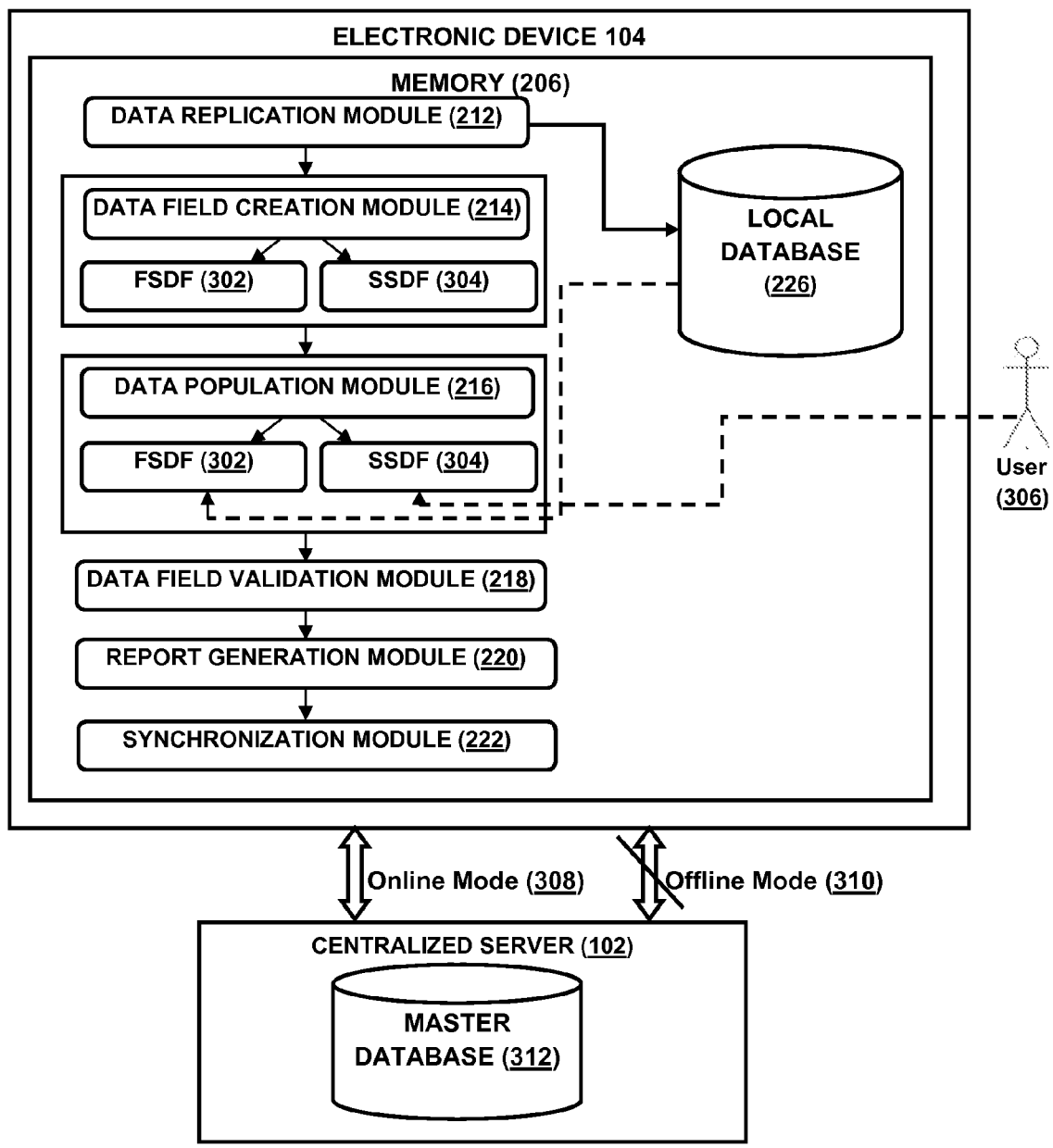
FIG. 3 illustrates the electronic device in accordance with an embodiment of the present subject matter.

Referring to FIG. 3, a detailed working of the components of an electronic device 104 is illustrated, in accordance with an embodiment of the present subject matter. In one implementation, a method for executing an enterprise process through an electronic device 104 connected to a centralized server 102 is disclosed herein. In one embodiment, the electronic device 104 may be selected from at least one of a mobile phone, a computer, a personal digital assistant (PDA), a laptop or a Smartphone.

In one embodiment, the centralized server 102 may comprise a master database 312 storing data associated with the enterprise process. In one embodiment, the master database 312 may be stored on a cloud based database server. The centralized server 102 may be connected to the cloud based database server through the network 106. In one aspect, the enterprise process may be associated to at least one of an insurance premium calculation, traffic police monitoring, census monitoring, land recovery survey, wholesale distributor tracking, delay detection, financial planners and courier dispatcher tracking.

In one aspect, the electronic device 104 may comprise a memory 206 coupled to a processor 202 for executing the enterprise process. The memory 206 may further comprise a plurality of modules that are configured to execute the enterprise process in at least one of an online mode 308 and an offline mode 310. In one aspect, the electronic device 104 may be independent of the specific technology platform used to execute the enterprise process. For example the plurality of modules may be configured to execute on the technology platforms including operating systems such as Windows, Android, iOS, Linux or combinations thereof. According to the present disclosure, the plurality of modules may comprise a data replication module 212, a data field creation module 214, a data population module 216, a data field validation module 218, a report generation module 220 and a synchronization module 222. In order to execute the enterprise process, the data replication module 212 may be configured to replicate the data from the master database 312 located at the centralized server 102 into a local database 226 of the electronic device 104. In one aspect, the data may be stored in the master database 312 is replicated to the local database 226 when the electronic device 104 is in the online mode 308. In one aspect, the local database 226 may be a SQLite database or any other lightweight relational database capable of storing the data.

In order to further execute the enterprise process, the electronic device 104 may not be present in the proximity of the centralized server 102. Thus, after the data is replicated from the master database 312 to the local database 226 as aforementioned, the electronic device 104 may be switched from the online mode 308 to the offline mode 310. During the offline mode 310, the data field creation module 214 may be configured to create a first set of data fields (FSDF) 302. In one aspect, the first set of data fields (FSDF) 302 are created based on a first set of rules. In one aspect, the first set of rules may be defined by using at least one of Adobe Flex®, hyper text markup language (HTML 5), jQuery™ or a HAXE-NLS framework. After creating the first set of data fields (FSDF) 302, the data population module 216 may be configured to populate a first set of data values (FSDV) 314 in the first set of data fields (FSDF) 302 by retrieving the data stored in the local database 226. In one aspect, the data being retrieved from the local database 226 may be based on a second set of rules. In one aspect, the second set of rules may comprise Country, State, Region, Company size, number of employees, age, insurance type, last paid premium, delayed premium payment, and combinations thereof. In one example the first of set of data values may vary based on the country or state like (New York, New Jersey, California etc). Similar is the case for number of employees in an enterprise and the age bracket like (18-30, 30-50, 50-70 and above) for which the enterprise process may be executed.

Subsequent to the creation of the first set of data fields (FSDF) 302, the data field creation module 214 may further be configured to dynamically create a second set of data fields (SSDF) 304. After creating the second set of data fields (SSDF) 304, the data population module 216 may further be configured to populate the second set of data fields (SSDF) 304 with a second set of data values (SSDV) 316. In one aspect, the second set of data values (SSDV) 316 may be received from a user 306. In one embodiment, each successive data field of the second set of data fields (SSDF) 304 may be dynamically created based on a data value of a previous data field of the each successive data field and the first set of rules. In one aspect, the first set of data values (FSDV) 314 may be static and dependent on the data of the enterprise process whereas the second set of data values (SSDV) 316 may be dynamic and based on the first set of data values (FSDV) 314.

Upon populating the second set of data fields (SSDF) 304, the data field validation module 218 may be configured to validate the second set of data fields (SSDF) 304 based on a third set of rules. In one aspect, the third set of rules may be defined to enable validation of data, received by the user 306, using at least one of a validation method i.e. allowed character checks, cardinality check, check digits, consistency checks, data type checks, limit check and combinations thereof. In one example, if one of a data field from the second set of data fields is having an amount in range of $5000 or above (where as the maximum limit for the particular field is only $4500), then based on the third set of rules, the data field validation module 218 may generate a warning and the data field suspected may be highlighted.

Subsequent to the validation of the data, a report generation module may be configured to generate report depicting information associated with the execution the enterprise process. In one aspect, the report may be generated based on analysis performed on the first set of data values (FSDV) 314 and the second set of data values (SSDV) 316. In one aspect, the report generated may be stored in the local database 226 for future references.

In one aspect, the electronic device 104 may again appear within the proximity of the centralized server 102. In order to facilitate the execution of the enterprise process, the electronic device 104 switches back into the online mode 308 from the offline mode 310. During the online mode 308, the synchronization module 222 may be configured to synchronize the local database 226 comprising the report stored therein with the master database 312 in order to facilitate the execution of the enterprise process. In one aspect, the local database 226 may be synchronized real-time once the electronic device 104 appears within the proximity of the centralized server 102. In order to perform real-time synchronization, the processor 202 may be adapted to detect whether the electronic device 104 is within the proximity of the centralized server 102. Upon detecting the electronic device 104 is within the proximity of the centralized server 102, the processor 202 may further be adapted to synchronize the local database 226 with the master database 312 in real-time. In another aspect, the local database 226 may be synchronized on reception of a trigger initiated by the user 306 through the electronic device 104. In one aspect, the synchronization may be performed by using at least one of an open source data services components such as a BlazeDS, a GraphiteDS, or Adobe Livecycle DataServices (LCDS).

In one aspect, the synchronization module 222 may further be configured to synchronize a schedule of the enterprise process being assigned to the user 306 through the centralized server 102 with the electronic device 104 that enables service level agreement (SLA) compliance and performance management of the user 306 and further enables to manage work queue among a plurality of users. In one embodiment, the synchronization of the schedule of the enterprise process with the electronic device 104 further enables a customer service representative (CSR) to efficiently allocate the work-load optimally to the user 306. This further allows the CSR to monitor the workflow associated with the entire execution of the enterprise process.

Advantages of the System

Exemplary embodiments discussed above may provide certain advantages. Though not required to practice aspects of the disclosure, these advantages may include those provided by the following features:

Some embodiments enable a system and a method that provides minimum software presence required for auditing in an auditor's laptop.

Some embodiments overcome the complexities of a spreadsheet based application and is further accentuated with the complexity of the manual audit.

Some embodiments further remove dependency on having additional network attached storage (NAS), UNIX batch jobs to extract the collated audit info from .xls format and jobs to insert the data into the centralized server.

Some embodiments further provide a radical design & architecture to seamlessly synchronize the data from their source system to the centralized server without any time lag.

Some embodiments further provide an integrated light weight database like SQLite that ensures that auditor to always have access to the correct dataset along with proper validations.

Some embodiments are independent of various platforms and hence may not be susceptible to external hacking.

Figure 4:
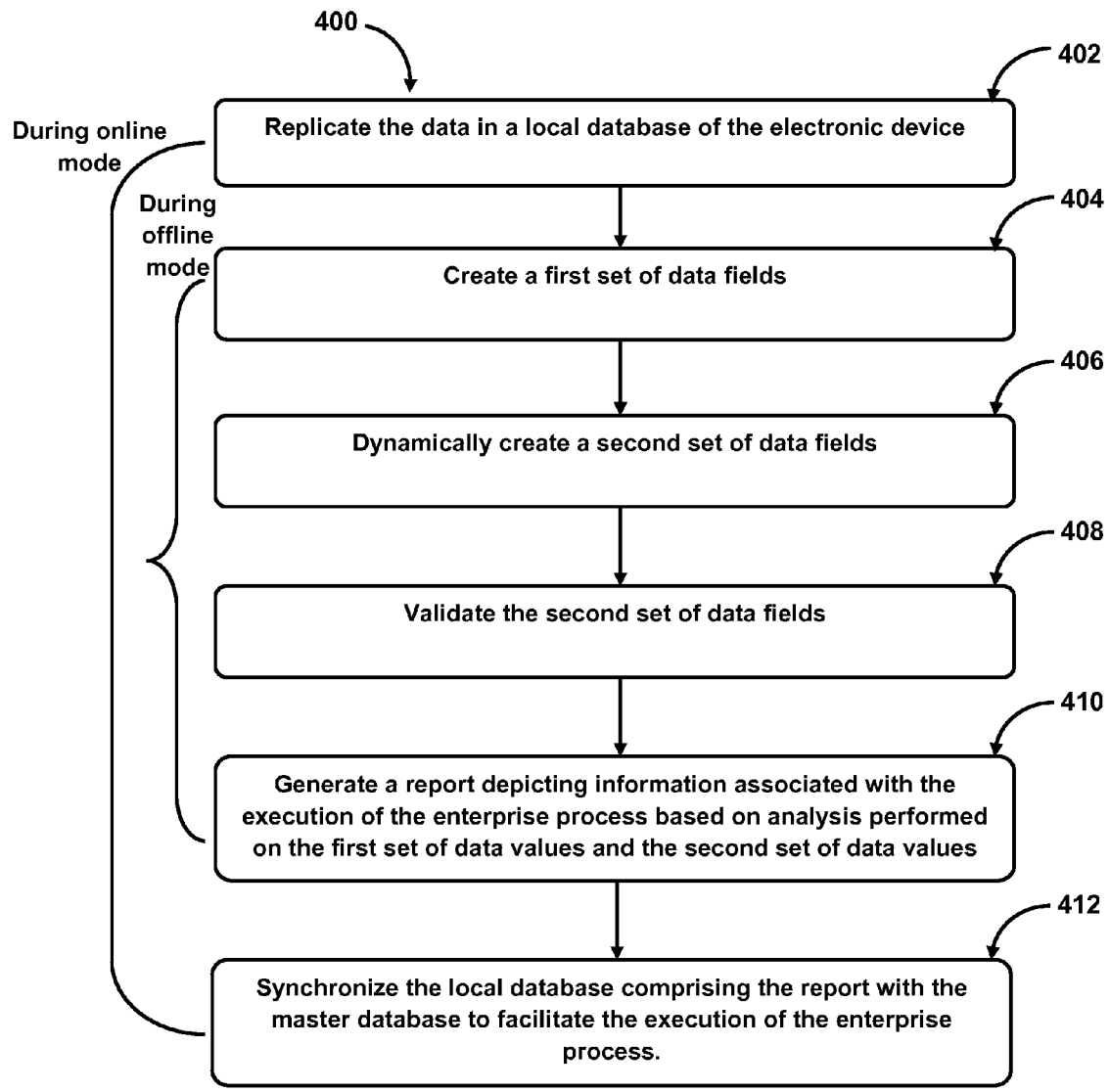
FIG. 4 illustrates a method for executing an enterprise process through the electronic device connected to the centralized server in at least one of the online mode and the offline mode is shown, in accordance with an embodiment of the present subject matter.

Referring now to FIG. 4, a method 400 for executing an enterprise process through an electronic device connected to a centralized server in at least one of an online mode and an offline mode is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described electronic device 104.

At block 402, the data may be replicated in a local database 226. In one implementation, the data may be replicated by the data replication module 212.

At block 404, a first set of data fields (FSDF) 302 and a second set of data fields (SSDF) 304 may be created. In one implementation, the first set of data fields (FSDF) 302 and the second set of data fields (SSDF) 304 may be created by the data field creation module 214.

At block 406, the first set of data fields (FSDF) 302 and the second set of data fields (SSDF) 304 may be populated with a first set of data values (FSDV) 314 and a second set of data values (SSDV) 316 respectively. In one implementation, the first set of data fields (FSDF) 302 and the second set of data fields (SSDF) 304 may be populated by the data population module 216.

At block 408, the second set of data fields (SSDF) 304 may be validated. In one implementation, the second set of data fields (SSDF) 304 may be validated by the data field validation module 218.

At block 410, a report may be generated, depicting information associated with the execution of the enterprise process. In one implementation, the report may be generated by the report generation module 220.

At block 412, the local database 226 comprising the report may be synchronized with the master database 312. In one implementation, the local database 226 may be synchronized with the master database 312 by the synchronization module 222.

In one implementation of the present subject matter, the block 404 to the block 410 may be implemented when the electronic device 104 is in the offline mode 310 whereas the block 402 and the block 412 may be implemented when the electronic device 104 is in the online mode 308.

Although implementations for methods and systems for executing an enterprise process through an electronic device 104 have been described in language specific to structural features and/or methods, it is to be understood that the appended claims are not necessarily limited to the specific features or methods described. Rather, the specific features and methods are disclosed as examples of implementations for executing the enterprise process through the electronic device 104 connected to the centralized server 102 in at least one of the online mode 308 and the offline mode 310.

We claim:

1. An enterprise process execution method, comprising:
   replicating data from a centralized database to a local database of an electronic device;
   creating a first set of data fields based on a first set of rules, wherein the first set of data fields is populated with a first set of data values being retrieved from the data stored in the local database based on a second set of rules, wherein the first set of data values are static and dependent on the enterprise process;
   dynamically creating, via a processor, a second set of data fields, wherein the second set of data fields is populated with a second set of data values provided by a user, wherein each data field of the second set of data fields is dynamically created based on a data value of a previous data field and the first set of rules, and wherein the second set of data values are dynamic and populated using user input and the first set of data values;
   validating the second set of data fields based on a third set of rules;
   generating a report including information associated with execution of an enterprise process, based on analysis performed on the first set of data values and the second set of data values; and
   synchronizing the local database storing the report with the centralized database to facilitate the execution of the enterprise process, wherein the synchronizing further enables synchronizing a schedule of the enterprise process being assigned to the user, through the centralized server with the electronic device, and wherein the local database is synchronized once the electronic device is in a range of network connectivity to the centralized server.

2. The method of claim 1, wherein the first set of rules is defined by using at least one of Adobe Flex®, hyper text markup language (HTML 5), jQuery™, or a HAXENLS framework.

3. The method of claim 1, wherein the enterprise process is associated with at least one of an insurance premium calculation, traffic police monitoring, census monitoring, land record survey, wholesale distributor tracking, financial planners or courier dispatchers tracking.

4. The method of claim 1, wherein the local database is a lightweight relational database capable of storing the data.

5. The method of claim 1, wherein the second set of rules relates to at least one of country, state, region, company size, number of employees, age, insurance type, last paid premium, delayed premium payment, or combinations thereof.

6. The method of claim 1, wherein the third set of rules is defined to enable validation of data entered by the user using at least one of allowed character checks, cardinality check, check digits, consistency checks, data type checks, limit check, or combinations thereof.

7. The method of claim 1, wherein the synchronization is performed using an open source data services components and wherein the open source data services components comprises at least one of a BlazeDS, a GraphiteDS, or Adobe Livecycle DataServices (LCDS).

8. The method of claim 1, wherein the replicating and the synchronizing are performed when the electronic device in an online mode and wherein the creating, the dynamically creating, the validating, and the generating are performed when the electronic device in an offline mode.

9. An enterprise process execution electronic device, comprising:
   a processor; and
   a memory coupled to the processor, wherein the processor is capable of executing a plurality of modules stored in the memory, and wherein the plurality of modules comprising:
      a data replication module configured to replicate data from a centralized database to a local database of an electronic device;
      a data field creation module configured to create a first set of data fields and a second set of data fields;
      a data population module configured to populate a first set of data values and a second set of data values in the first set of data fields and the second set of data fields respectively, wherein the first set of data values are static and dependent on the enterprise process and wherein the second set of data values are dynamic and populated using user input and the first set of data values;
      a data field validation module configured to validate the second set of data fields;
      a report generation module configured to generate a report including information associated with execution of an enterprise process; and
      a synchronization module configured to synchronize the local database storing the report with the centralized database to facilitate the execution of the enterprise process, wherein the synchronizing further enables synchronizing a schedule of the enterprise process being assigned to the user, through the centralized server with the electronic device, and wherein the local database is synchronized once the electronic device is in a range of network connectivity to the centralized server.

10. The electronic device of claim 9, wherein the electronic device is at least one of a mobile phone, a computer, a personal digital assistant (PDA), a laptop, or a Smartphone.

11. The electronic device of claim 9, wherein the first set of rules is defined by using at least one of Adobe Flex®, hyper text markup language (HTML 5), jQuery™, or a HAXENLS framework.

12. The electronic device of claim 9, wherein the enterprise process is associated with at least one of an insurance premium calculation, traffic police monitoring, census monitoring, land record survey, wholesale distributor tracking, financial planners or courier dispatchers tracking.

13. The electronic device of claim 9, wherein the local database is a lightweight relational database capable of storing the data.

14. The electronic device of claim 9, wherein the second set of rules relates to at least one of country, state, region, company size, number of employees, age, insurance type, last paid premium, delayed premium payment, or combinations thereof.

15. The electronic device of claim 9, wherein the third set of rules is defined to enable validation of data entered by the user using at least one of allowed character checks, cardinality check, check digits, consistency checks, data type checks, limit check, or combinations thereof.

16. The electronic device of claim 9, wherein the synchronization is performed using an open source data services components and wherein the open source data services components comprises at least one of a BlazeDS, a GraphiteDS, or Adobe Livecycle Data Services (LCDS).

17. A non-transitory computer program product having embodied thereon a computer program instructions for executing an enterprise process, the instructions comprising instructions for:

replicating data from a centralized to a local database of an electronic device;

creating a first set of data fields, based on a first set of rules, wherein the first set of data fields is populated with a first set of data values being retrieved from the data in the local database based on a second set of rules, wherein the first set of data values are static and dependent on the enterprise process;

dynamically creating a second set of data fields, wherein the second set of data fields is populated with a second set of data values provided by a user, and wherein each successive data field of the second set of data fields is dynamically created based on a data value of a previous data field of the each successive data field and the first set of rules, and wherein the second set of data values are dynamic and populated using user input and the first set of data values;

validating the second set of data fields based on a third set of rules;

generating a report including information associated with execution of an enterprise process based on analysis performed on the first set of data values and the second set of data values; and synchronizing the local database storing the report with the master database to facilitate the monitoring execution of the enterprise process, wherein the synchronizing further enables synchronizing a schedule of the enterprise process being assigned to the user, through the centralized server with the electronic device, and wherein the local database is synchronized once the electronic device is in a range of network connectivity to the centralized server.

\* \* \* \* \*